(No Model.)
L. B. BEAUMONT.
FENDER.
No. 265,006. Patented Sept. 26, 1882.
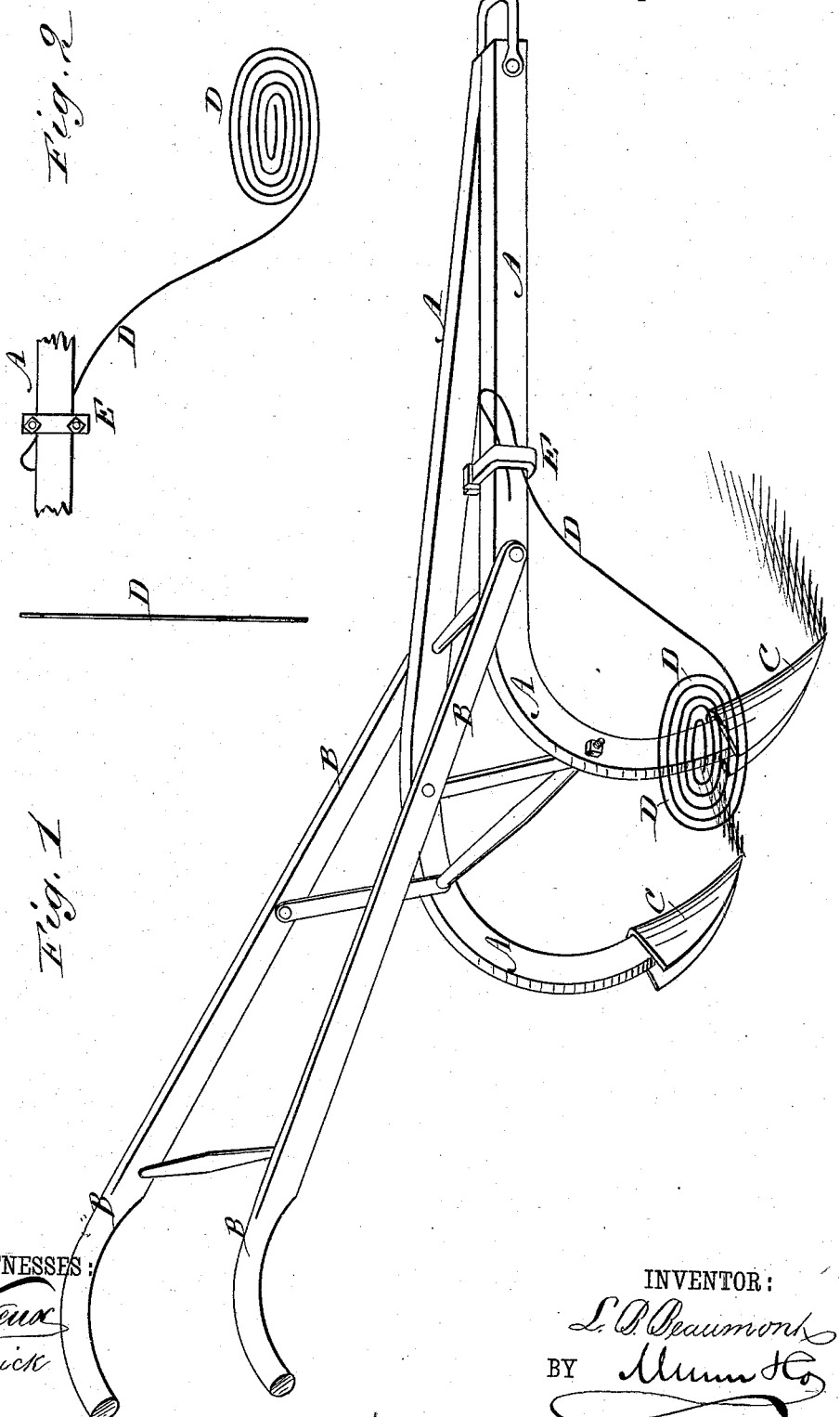
WITNESSES:
C. Neveux
C. Sedgwick
INVENTOR:
L. B. Beaumont
BY Munn & Co
ATTORNEYS.

UNITED STATES PATENT OFFICE.

LUCIEN B. BEAUMONT, OF ALEXANDRIA, OHIO.

FENDER.

SPECIFICATION forming part of Letters Patent No. 265,006, dated September 26, 1882.

Application filed January 25, 1882. (No model.)

*To all whom it may concern:*

Be it known that I, LUCIEN B. BEAUMONT, of Alexandria, Licking county, Ohio, have invented a new and useful Improvement in Fenders for Cultivator-Plows, of which the following is full, clear, and exact description.

Reference is to be had to the accompanying drawings, forming part of this specification, in which similar letters of reference indicate corresponding parts in all the figures.

Figure 1 is a perspective view of a cultivator to which my improvement has been applied. Fig. 2 is a side elevation of the fender and a part of the plow-beam, and Fig. 3 is a plan view of the fender detached.

The object of this invention is to allow fine soil to pass freely to and around plants, while preventing clods and stones from being thrown against and injuring the plants.

A represents the beams, B the handles, and C the shovels, of an ordinary cultivator-plow.

The fender D is formed of a round rod of steel or other suitable material about five-sixteenths of an inch in diameter, and which is coiled spirally into an oval form, as shown in Figs. 1 and 2, in such a manner that the coils may all be in the same vertical plane, as shown in Fig. 3. The coils of the fender should be at such a distance apart that the fine soil will pass between the said coils freely, while the passage of lumps, clods, and stones of sufficient size to injure the plants will be prevented.

The outer end of the rod that forms the fender is preferably made thicker than the coil to strengthen it as a support against obstructions, is bent forward and upward, and is bent back upon itself into U form, so as to rest against the side of the plow-beam A. The bent end of the coiled rod is secured against the side of the plow-beam by a clamp, E, as shown in Figs. 1 and 2, or by other suitable means. The clamp E allows the fender D to be readily adjusted, and the band or loop in the end of the fender-rod allows the said clamp E to clasp and hold the said rod firmly.

The fender D should be arranged at a distance of about two and a half inches from the side of the outer shovel, C, so as to allow clods and stones to pass back between the said fender and shovel, while the fine soil passes freely through the spaces between the coils of the fender to and around the plants. As the plants become larger the inner end of the spiral fender can be raised and held up by a hook or other suitable means, so as to enlarge the spaces between the lower parts of the coils, and thus allow more soil to pass to the plants.

I am aware that a coil is not new as a plow-fender; but

What I claim is—

A plow attachment composed of a single rod or bar coiled to form a fender, and having a portion thereof extended forward for an attaching-arm and the end turned back upon itself to adapt it to be clamped to the beam, substantially as shown and described.

LUCIEN BONAPARTE BEAUMONT.

Witnesses:
O. M. KLUE,
D. E. W. JONES.